C. H. WINSLOW.
CROCHET BALL HOLDER.
APPLICATION FILED APR. 19, 1915.
1,167,141.
Patented Jan. 4, 1916.
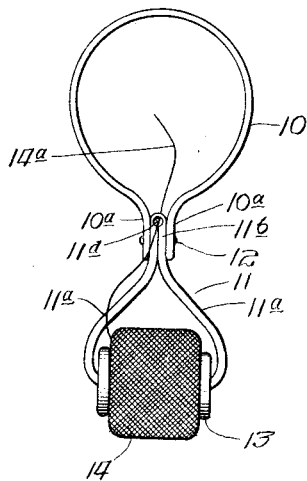
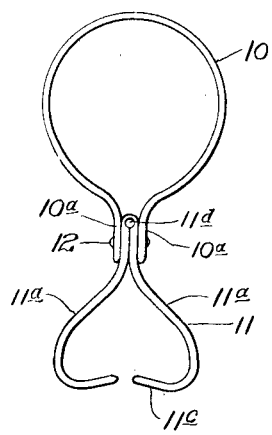
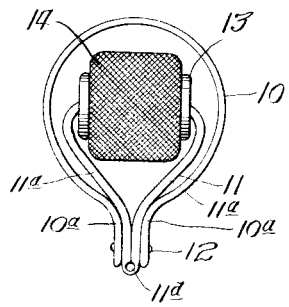
Witness:
Harry S. Gaither
Inventor
Charlotte H. Winslow
by Sheridan, Wilkinson & Scott
Attys.

UNITED STATES PATENT OFFICE.

CHARLOTTE H. WINSLOW, OF CHICAGO, ILLINOIS, ASSIGNOR TO MARSHALL FIELD & CO., A CORPORATION OF ILLINOIS.

CROCHET-BALL HOLDER.

1,167,141.

Specification of Letters Patent.

Patented Jan. 4, 1916.

Application filed April 19, 1915. Serial No. 22,396.

*To all whom it may concern:*

Be it known that I, CHARLOTTE H. WINSLOW, a citizen of the United States, residing at Chicago, in the county of Cook and State of Illinois, have invented certain new and useful Improvements in Crochet-Ball Holders, of which the following is a specification.

This invention relates to improvements in crochet ball holders, and has for its object to provide a device of that nature in which may be inserted, and which will operate to rotatably carry a ball or spool of material used for crocheting, or for similar purposes.

Another object is to provide a spool-carrying member of this nature, together with a loop which may be fitted over and carried on the wrist of the user, the former being pivotally attached to the latter, and arranged to be moved into the loop when not in use so as to fold into a convenient size to be carried in a work, or hand-bag, without necessitating the disengagement of the ball, or spool, from the holder.

Still another object is to provide a device of the nature described above, which is constructed with a thread-guiding means, through which may be passed the end of the crochet thread, which will serve to guide the same while it is being used, allowing it to be readily run off or unrolled without tangling, and as needed. The structure by which I attain this and other objects is set forth and described below and shown in the accompanying drawing, in which:

Figure 1 is a front elevation of my device, showing a crochet spool carried thereby, as in use; Fig. 2 is a similar view showing the ball and carrying means swung into the loop, as is generally desirable when the device is not in use; and Fig. 3 is a front elevation of my invention shown without the spool.

Like numerals refer to like elements in the drawing, in which 10 indicates generally what I term a loop member having the parallel spaced apart extremities 10ᵃ. This loop is of sufficient diameter to permit insertion therethrough of the hand of the user, so that it may fit around the wrist.

11 indicates generally what I term the spool-carrying member comprising arms 11ᵃ diverging from portions 11ᵇ thereof, which are integrally connected and lie in contact with each other, as is clearly shown in the drawing. These contacting portions 11ᵇ of the arms 11ᵃ are arranged for mounting between the extremities 10ᵃ of the loop 10, between which they are pivotally mounted on a pin 12, or the like. At their other extremities the arms 11ᵃ are formed with the inwardly turned jaws 11ᶜ adapted to fit in the aperture of a spool, or the like. In the looped contacting portions 11ᵇ of arms 11ᵃ, I provide an aperture 11ᵈ which constitutes a thread-guiding means, as will be more fully described below.

I preferably construct the members 10 and 11 of celluloid, horn, ivory, or the like, for lightness, and to provide an article of pleasing appearance, although I do not wish to confine myself to the use of such materials. When constructed of suitable material the arms 11ᵃ may be sprung apart so that a crochet spool 13, or the like, may be inserted therebetween, the jaws 11ᶜ fitting in the aperture thereof, as explained above. The end 14ᵃ of the crochet thread 14 carried on the spool 13, is passed through the aperture 11ᵈ to the needle or hook of the user, who may pass the loop 10 on his or her wrist to readily suspend and carry the spool, or ball, 13. When the device is not in use, the spool-carrying member 11 may be pivotally swung into the loop 10, as shown in Fig. 2, in which position it occupies considerably less room, so as to be readily inserted into, or removed from, a work-bag without requiring the disengagement of the spool, or ball, from the holder.

It will be apparent that I have provided a new and useful article which is susceptible of modifications and improvements, and consequently I do not wish to be restricted to the form shown and described beyond the scope of the appended claims.

What I claim is:—

1. A device of the character described, comprising a permanently distended loop member, and a spool-supporting member pivotally attached to the loop member upon an axis in the plane of the loop member to permit movement of the spool-supporting member, together with the spool supported thereby, into said loop member.

2. A device of the class described, comprising a loop member formed of a continuous strip of material having its ends projecting radially from the loop member in close proximity to each other, and a spool-supporting member pivotally connected to the ends of said loop member upon an axis parallel to the plane of said loop member.

3. A device of the character described, comprising a permanently distended loop member, a spool-engaging member pivotally attached to the loop member, said spool member comprising arms having spool-engaging jaws, said arms being narrowed into contact for a portion of their length, and said contacting portions being provided with a thread-guiding aperture.

4. A device of the class described comprising a loop member having parallel adjacent extremities, and a spool-carrying member comprising arms, said arms being bent or looped into contact adjacent one extremity, said contacting portions of said arms being pivotally mounted between said parallel extremities of said loop member to permit their movement into or out of said loop member.

5. A device of the class described comprising a loop member having parallel adjacent extremities, and a spool-carrying member comprising arms, said arms being bent or looped into contact adjacent one extremity, said contacting portions of said arms being pivotally mounted between said parallel extremities of said loop member to permit their movement into or out of said loop member, said contacting portions of said arms being provided with a thread-guiding aperture therethrough.

In testimony whereof, I have subscribed my name.

CHARLOTTE H. WINSLOW

Witnesses:
  Geo. L. Wilkinson,
  Henry A. Parks.